(12) United States Patent
Choi et al.

(10) Patent No.: US 10,645,461 B2
(45) Date of Patent: May 5, 2020

(54) METHOD FOR PROVIDING AD-HOC BROADCAST SERVICE BASED ON CHANNEL SHARING AND APPARATUS FOR THE SAME

(71) Applicant: Electronics and Telecommunications Research Institute, Daejeon (KR)

(72) Inventors: Dong-Joon Choi, Daejeon (KR);
Heung-Mook Kim, Daejeon (KR);
Sung-Ik Park, Daejeon (KR);
Joon-Young Jung, Daejeon (KR);
Yong-Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/210,961

(22) Filed: Dec. 5, 2018

(65) Prior Publication Data

US 2019/0174200 A1  Jun. 6, 2019

(30) Foreign Application Priority Data

Dec. 6, 2017  (KR) .................. 10-2017-0166367

(51) Int. Cl.
| | |
|---|---|
| *H04N 7/173* | (2011.01) |
| *H04N 21/61* | (2011.01) |
| *H04N 21/43* | (2011.01) |
| *H04H 20/30* | (2008.01) |
| *H04H 20/18* | (2008.01) |
| *H04H 20/67* | (2008.01) |

(Continued)

(52) U.S. Cl.
CPC ......... *H04N 21/6112* (2013.01); *H04H 20/18* (2013.01); *H04H 20/30* (2013.01); *H04H 20/67* (2013.01); *H04N 21/2383* (2013.01); *H04N 21/2385* (2013.01); *H04N 21/4305* (2013.01); *H04W 84/18* (2013.01)

(58) Field of Classification Search
CPC ........... H04N 21/6112; H04N 21/2383; H04N 21/2385; H04N 21/4305; H04H 20/18; H04H 20/30; H04H 20/67; H04W 84/18
See application file for complete search history.

(56) References Cited

U.S. PATENT DOCUMENTS

| | | | |
|---|---|---|---|
| 8,155,045 B2 | 4/2012 | Sherman et al. | |
| 9,332,440 B2 | 5/2016 | Kang et al. | |

(Continued)

FOREIGN PATENT DOCUMENTS

| | | |
|---|---|---|
| JP | 2009-542099 A | 11/2009 |
| KR | 10-2014-0006492 A | 1/2014 |

*Primary Examiner* — Mulugeta Mengesha
(74) *Attorney, Agent, or Firm* — NSIP Law

(57) ABSTRACT

Disclosed herein are a method for providing an ad-hoc broadcast service based on channel sharing and an apparatus for the same. The method is configured such that a master broadcast transmitter for providing an ad-hoc broadcast service receives a request to share a channel from a new broadcast transmitter, allocates one of multiple subframes, into which the transmission frame of any one broadcast channel corresponding to the ad-hoc broadcast service is divided, to the new broadcast transmitter, and controls the new broadcast transmitter in real time by performing synchronization with the new broadcast transmitter based on reference time information included in a control Physical Layer Pipe (PLP).

16 Claims, 12 Drawing Sheets

(51) Int. Cl.
*H04N 21/2383* (2011.01)
*H04N 21/2385* (2011.01)
*H04W 84/18* (2009.01)

(56) References Cited

U.S. PATENT DOCUMENTS

| | | | |
|---|---|---|---|
| 9,485,665 B2 | 11/2016 | Kang et al. | |
| 2010/0238890 A1* | 9/2010 | Mo | H04W 56/0015 370/329 |
| 2011/0197219 A1* | 8/2011 | Ross | H04N 7/16 725/31 |
| 2012/0122500 A1* | 5/2012 | Wetmore | H04B 7/0671 455/500 |
| 2013/0034035 A1* | 2/2013 | Kazmi | H04W 56/0085 370/311 |
| 2016/0241610 A1 | 8/2016 | Zhang et al. | |

* cited by examiner

INDOORS

METHOD FOR PROVIDING AD-HOC BROADCAST SERVICE BASED ON CHANNEL SHARING AND APPARATUS FOR THE SAME

CROSS REFERENCE TO RELATED APPLICATION

This application claims the benefit of Korean Patent Application No. 10-2017-0166367, filed Dec. 6, 2017, which is hereby incorporated by reference in its entirety into this application.

BACKGROUND OF THE INVENTION

1. Technical Field

The present invention relates generally to technology for providing ad-hoc broadcast services by sharing a single channel, and more particularly to technology for constructing multiple ad-hoc broadcast networks by sharing a single broadcast frequency channel in the same area based on ATSC 3.0 or DVB-T2, which is selected as the next-generation terrestrial broadcast standard.

2. Description of the Related Art

Recently, with the emergence and development of the Internet, the number of individuals who produce and share content as desired is rapidly increasing. Also, with the development of technology for producing, editing and sharing video for broadcast, "me-media", which refers to online services for enabling a user to process and produce media, such as video or the like, is widely spread, and is replacing text-based content as the method for sharing personal profiles. Particularly, Google's YouTube and AfreecaTV, provided in Korea, have constructed platforms known as 'Multi-Channel Networks (MCN)', thereby securing potential customers for me-media and providing services such as content organization, collaboration between creators, digital rights management, monetization, sales, and the like.

Currently, services for me-media are provided mainly based on a wired network, but services based on a wireless broadcast network receive a lot of attention. One of the main characteristics of broadcast networks using wireless networks, such as terrestrial networks, and the like, is to enable many people in a wide area to simultaneously watch a single piece of served content. To this end, a broadcast provider who intends to provide services based on a wireless network must get permission for radio transmission using a specific frequency band in the area in which the service is to be provided and must design and manage a broadcast network so as not to interfere with the frequency band of other providers. However, with the popularization of personal broadcast services based on a wired network, the need for ad-hoc broadcast services that take a different form from the conventional wireless broadcast service has arisen.

The ad-hoc broadcast service temporarily constructs a broadcast network in a small area, in which it is difficult to construct a broadcast network to provide a broadcast of an event, thereby providing a broadcast service using the temporarily constructed broadcast network. Therefore, as opposed to an existing broadcast network, which is constructed and maintained for a long time, it is necessary to quickly allocate and revoke a frequency band for a short period and to automatically avoid interference between a broadcast network that is being served and a newly constructed broadcast network during the allocation and revocation of the frequency band. Also, it is required to enable ad-hoc broadcast networks in narrow service ranges to interwork with each other in order to extend the service range. In connection with, U.S. Patent Application Publication No. 2016/0241610 discloses a technology related to "Ad-hoc group call communications over evolved multimedia broadcast multicast service".

SUMMARY OF THE INVENTION

An object of the present invention is to temporarily construct an ad-hoc broadcast network in a small area based on a next-generation terrestrial broadcast standard in consideration of compatibility with terrestrial broadcast transmitters, thereby providing a broadcast service.

Another object of the present invention is to configure multiple ad-hoc broadcast networks through a single broadcast channel, to facilitate various types of infrastructure for me-media, and to stimulate the emergence of new services and broadcast markets related thereto.

In order to accomplish the above objects, a method for providing ad-hoc broadcast services based on channel sharing according to the present invention includes receiving, by a master broadcast transmitter for providing an ad-hoc broadcast service, a request to share a channel from a new broadcast transmitter; allocating, by the master broadcast transmitter, one of multiple subframes, into which a transmission frame of any one broadcast channel corresponding to the ad-hoc broadcast service is divided, to the new broadcast transmitter; and performing, by the master broadcast transmitter, synchronization with the new broadcast transmitter based on reference time information included in a control Physical Layer Pipe (PLP), thereby controlling the new broadcast transmitter in real time.

Here, allocating one of the multiple subframes may include transmitting a bootstrap and a preamble to the new broadcast transmitter and thereby providing band allocation information corresponding to the subframe when the transmission frame is an ATSC 3.0 frame; and transmitting a P1 symbol and a P2 symbol to the new broadcast transmitter and thereby providing band allocation information corresponding to the subframe when the transmission frame is a DVB-T2 frame.

Here, the method may further include including the control PLP in a subframe for the master broadcast transmitter, but using a common PLP of the P2 symbol as the control PLP when the common PLP is capable of including the control PLP.

Here, the reference time information may be set using a reference clock counter value in the master broadcast transmitter.

Here, the reference time information may correspond to a time at which the bootstrap is transmitted or a time delayed for a preset time offset from the time at which the bootstrap is transmitted when the transmission frame is the ATSC 3.0 frame, and the reference time information may correspond to a time at which the P1 symbol is transmitted when the transmission frame is the DVB-T2 frame.

Here, controlling the new broadcast transmitter may be configured to transmit the reference time information to the new broadcast transmitter using the control PLP such that the new broadcast transmitter corrects internal time information so as to match the reference time information.

Here, the multiple subframes are acquired by dividing the transmission frame using any one of Time-Division Multiple Access (TDMA) and Frequency-Division Multiple Access (FDMA).

Here, when the transmission frame is the DVB-T2 frame, the multiple subframes may correspond to at least one data symbol.

Also, a broadcast transmitter according to an embodiment of the present invention includes a processor for receiving a request to share a channel from a new broadcast transmitter for providing an ad-hoc broadcast service, allocating one of multiple subframes, into which a transmission frame of any one broadcast channel corresponding to the ad-hoc broadcast service is divided, to the new broadcast transmitter, and controlling the new broadcast transmitter in real time by performing synchronization with the new broadcast transmitter based on reference time information included in a control Physical Layer Pipe (PLP); and memory for storing the reference time information and control information for sharing the any one broadcast channel.

Here, the processor may be configured to provide band allocation information corresponding to the subframe by transmitting a bootstrap and a preamble to the new broadcast transmitter when the transmission frame is an ATSC 3.0 frame; and to provide band allocation information corresponding to the subframe by transmitting a P1 symbol and a P2 symbol to the new broadcast transmitter when the transmission frame is a DVB-T2 frame.

Here, the processor may include the control PLP in the subframe corresponding to the broadcast transmitter, but may use a common PLP of the P2 symbol as the control PLP when the common PLP is capable of including the control PLP.

Here, the reference time information may be set using a reference clock counter value in the broadcast transmitter.

Here, the reference time information may correspond to a time at which the bootstrap is transmitted or a time delayed for a preset time offset from the time at which the bootstrap is transmitted when the transmission frame is the ATSC 3.0 frame, and the reference time information may correspond to a time at which the P1 symbol is transmitted when the transmission frame is the DVB-T2 frame.

Here, the processor may transmit the reference time information to the new broadcast transmitter using the control PLP such that the new broadcast transmitter corrects internal time information so as to match the reference time information.

Here, the multiple subframes may be acquired by dividing the transmission frame using any one of Time-Division Multiple Access (TDMA) and Frequency-Division Multiple Access (FDMA).

Here, when the transmission frame is the DVB-T2 frame, the multiple subframes may correspond to at least one data symbol.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
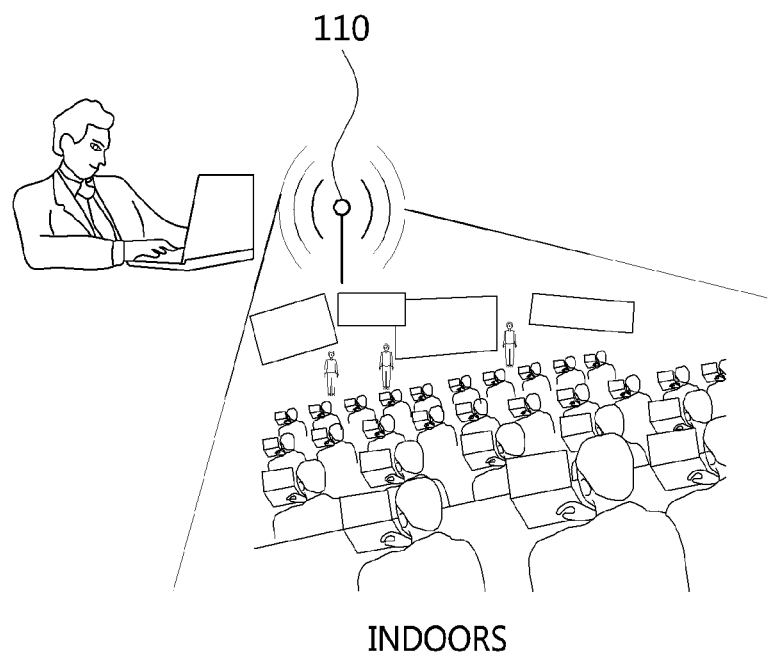
FIGS. 1 to 3 are views that show an example of an ad-hoc broadcast service.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 2:
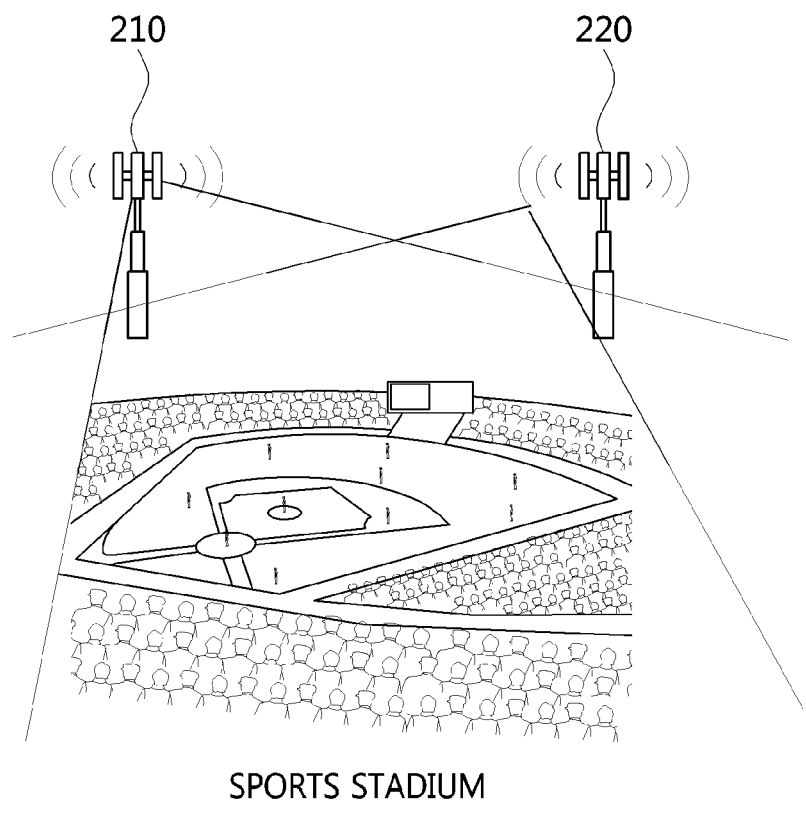
Figure 3:
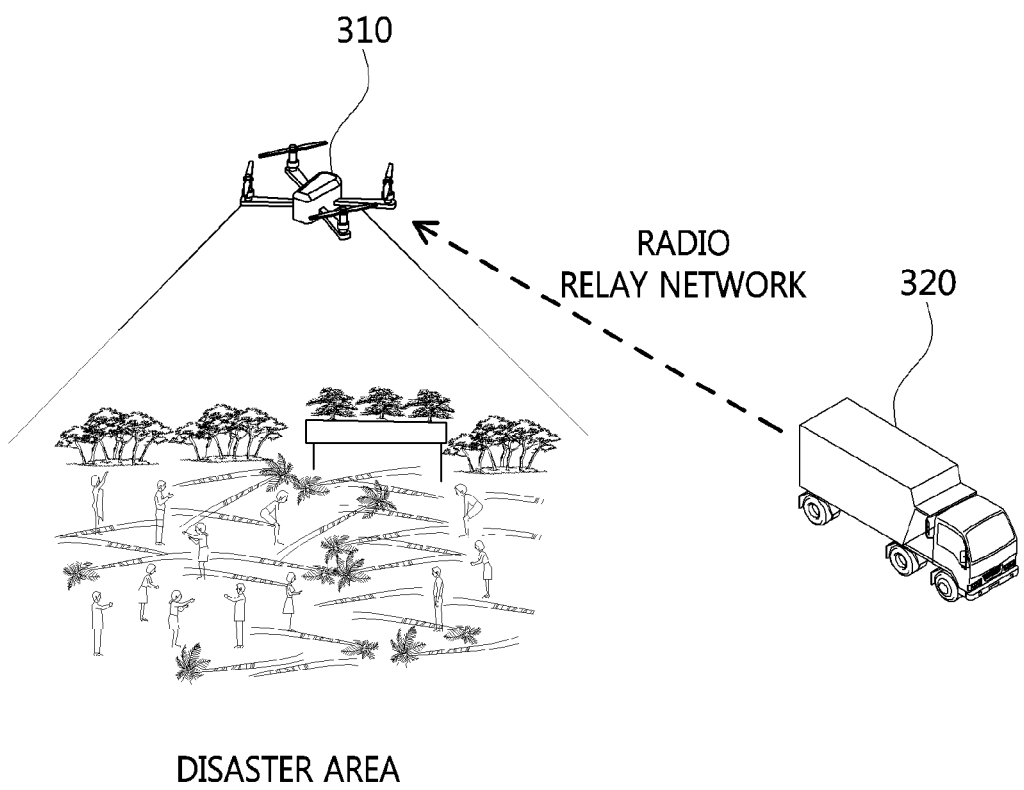

FIGS. 1 to 3 are views that show an example of an ad-hoc broadcast service.

Referring to FIGS. 1 to 3, an ad-hoc broadcast service is aimed at temporarily constructing a broadcast network in a small area and providing a broadcast service.

For example, an ad-hoc broadcast service may be provided using a small-size low-power broadcast transmitter 110 and a personal mobile terminal, such as a laptop, a mobile phone, or the like, in order to enable multiple users to receive the same content indoors, such as in a lecture room, a classroom, an office, or the like, as shown in FIG. 1. Here, low-power radio, the energy of which is equal to or less than 10 mW/MHz, may be used without obtaining permission to use radio frequencies and without frequency assignment.

In another example, when an ad-hoc broadcast service is provided in a wide area, such as a sports stadium or an exhibition hall, the broadcast service may be provided by forming a Single-Frequency Network (SFN) using ad-hoc broadcast networks configured with multiple broadcast transmitters 210 and 220, as shown in FIG. 2.

In another example, in an environment in which it is difficult to steadily maintain a broadcast network, such as a disaster area or an emergency area, a broadcast service may be provided using a broadcast transmitter 310 mounted on a drone or an unmanned air vehicle, as shown in FIG. 3.

Figure 4:
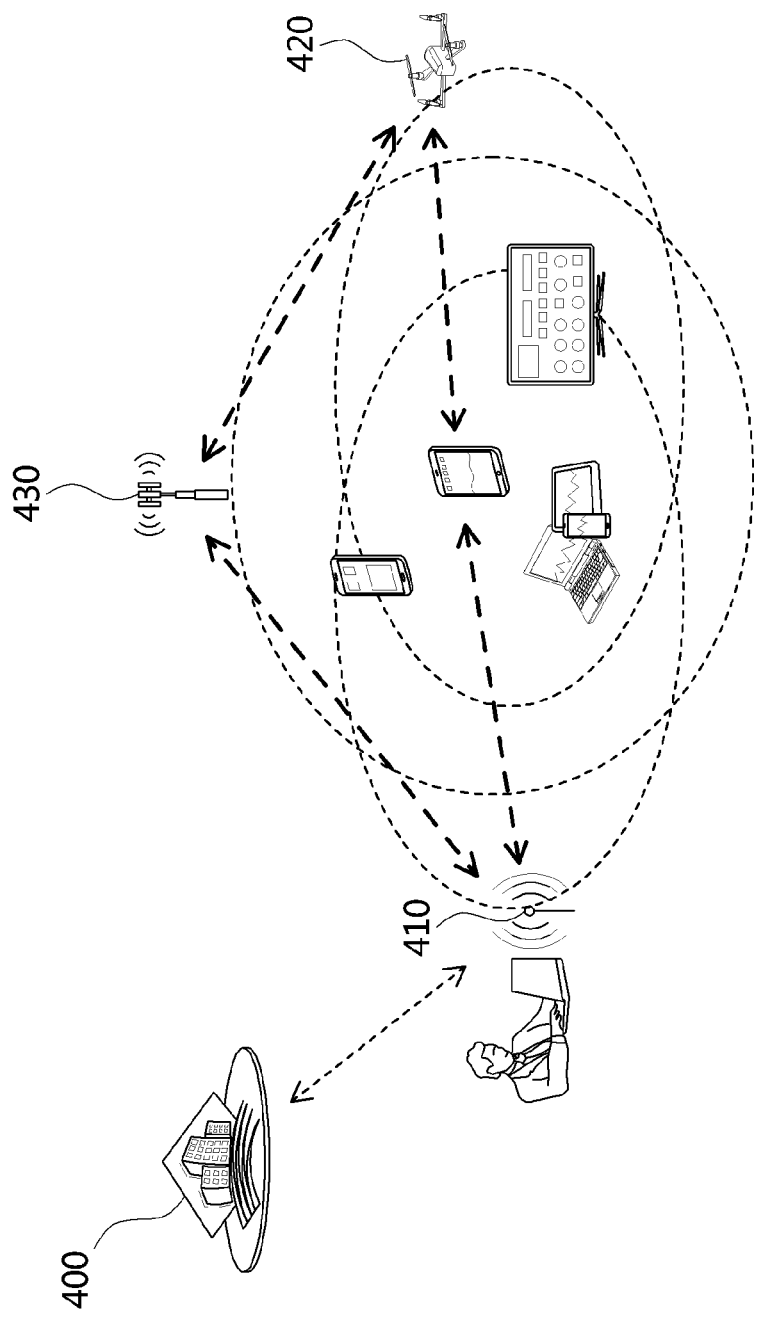
FIG. 4 is a view that shows an example of an ad-hoc broadcast service system in which an ad-hoc broadcast network is connected with an ad-hoc communication network according to the present invention.

FIG. 4 is a view that shows an example of an ad-hoc broadcast service system in which an ad-hoc broadcast network is connected with an ad-hoc communication network according to the present invention.

Referring to FIG. 4, the ad-hoc broadcast network according to the present invention may be configured based on communication between broadcast transmitters 410, 420 and 430 for providing ad-hoc broadcast services.

Generally, in the case of a broadcast frequency band, a single RF channel has a 6 MHz bandwidth, and data may be transmitted at a rate of about 25 Mbps or higher in a fixed wireless communication environment when the ATSC 3.0 standard, which is the next-generation digital broadcast standard, is applied. Here, when high-efficiency video coding is additionally applied, three or more full-HD video images may be transmitted through a single RF channel.

That is, when a single broadcast channel having a 6 MHz bandwidth is allocated for an ad-hoc broadcast service, it is possible to configure an ad-hoc broadcast network that is capable of providing at least three HD broadcast services, as shown in FIG. 4.

Accordingly, the present invention proposes technology for constructing multiple ad-hoc broadcast networks by sharing a single broadcast frequency channel in the same area based on ATSC 3.0 or DVB-T2, which is selected as the next-generation terrestrial broadcast standard.

Figure 5:
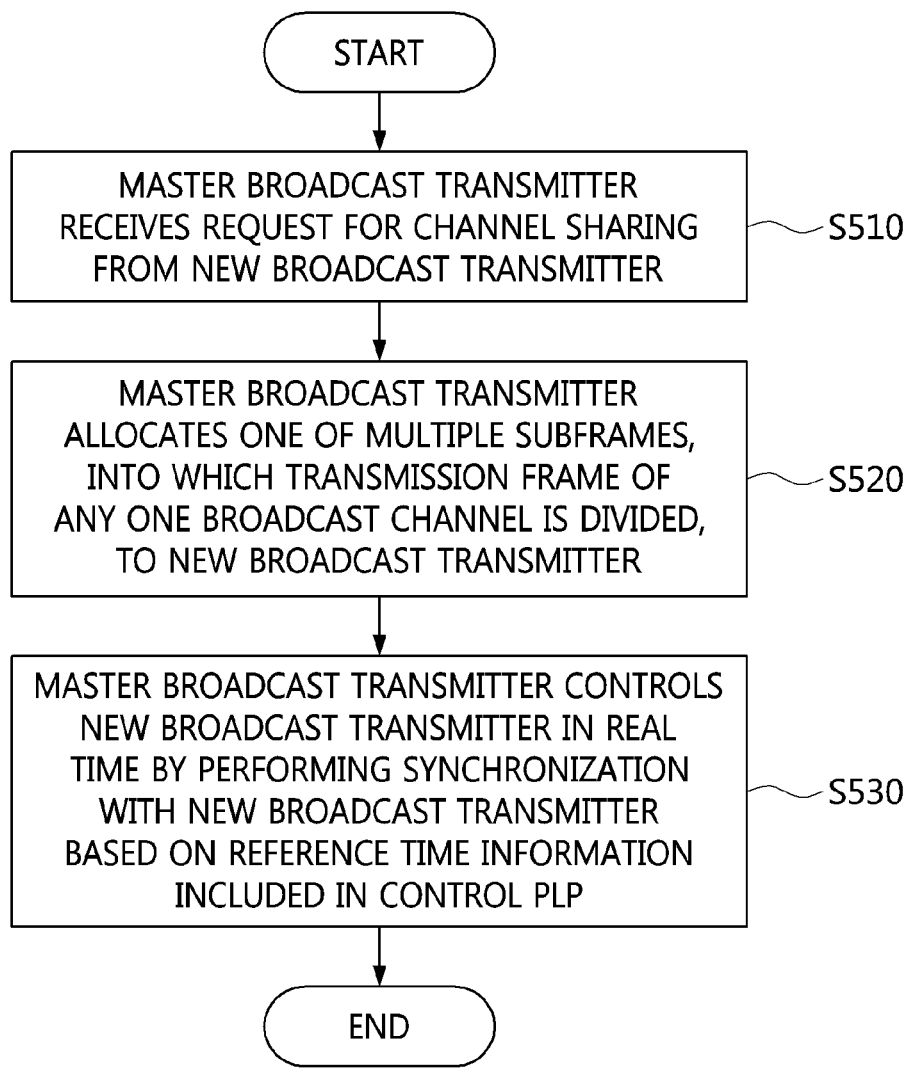
FIG. 5 is a flowchart that shows a method for providing an ad-hoc broadcast service based on channel sharing according to an embodiment of the present invention.

FIG. 5 is a flowchart that shows a method for providing ad-hoc broadcast services based on channel sharing according to an embodiment of the present invention.

Referring to FIG. 5, in the method for providing ad-hoc broadcast services based on channel sharing according to an embodiment of the present invention, a master broadcast transmitter that provides an ad-hoc broadcast service receives a request to share a channel from a new broadcast transmitter at step S510.

Here, the master broadcast transmitter is a broadcast transmitter that provides an ad-hoc broadcast service, and one of multiple broadcast transmitters that share a single broadcast channel may be selected and used as the master broadcast transmitter.

Here, the master broadcast transmitter may be selected using any of various methods. For example, the broadcast transmitter that first uses the frequency for providing an ad-hoc broadcast service and thereby configures an ad-hoc broadcast network in the corresponding area may be selected as the master broadcast transmitter.

Also, in the method for providing ad-hoc broadcast services based on channel sharing according to an embodiment of the present invention, a special agent that functions to allocate and manage a frequency band for an ad-hoc broadcast service may be used.

If an agent is present, the master broadcast transmitter may provide a broadcast service by transmitting and receiving information for configuring an ad-hoc broadcast network to and from the agent via a communication network. However, the agent is not essential, and the master broadcast transmitter may function to allocate and manage a frequency band for an ad-hoc broadcast service when there is no agent.

In FIG. 5, a description will be made on the assumption that there is no agent.

Here, the new broadcast transmitter may be a broadcast transmitter that intends to configure a new ad-hoc broadcast network by sharing the broadcast channel with the master broadcast transmitter. That is, when the master broadcast transmitter provides an ad-hoc broadcast service through a specific broadcast channel, the new broadcast transmitter may request to share the specific broadcast channel in order to provide a new ad-hoc broadcast service.

Here, the master broadcast transmitter may function to allocate a subframe for data transmission to other broadcast transmitters and to provide control information that is necessary for multiple access, including physical layer parameters and the like. Accordingly, the new broadcast transmitter may receive necessary information by requesting channel sharing based on communication with the master broadcast transmitter.

If there is an agent, the new broadcast transmitter may receive necessary information from the agent via the master broadcast transmitter.

Here, communication between the master broadcast transmitter and the new broadcast transmitter may be performed using a wireless ad-hoc communication network such as a mobile ad-hoc network (MANET), a Peer-to-Peer (P2P) communication network, or a wireless mobile communication network such as LTE or the like. Here, when a wireless ad-hoc communication network or a P2P communication network is used, a communication network may be configured based on multiple reception terminals in consideration of the physical distance between the broadcast transmitters.

Through the above-described method, broadcast transmitters may be connected with each other through communication networks, whereby non-real-time control information and network management information may be delivered therebetween. Here, real-time control information may be transmitted by allocating a band in the subframe of the master broadcast transmitter, which will be described in detail later with a description of a control Physical Layer Pipe (PLP).

Also, in the method for providing ad-hoc broadcast services based on channel sharing according to an embodiment of the present invention, the master broadcast transmitter allocates one of multiple subframes, into which the transmission frame of any one broadcast channel corresponding to an ad-hoc broadcast service is divided, to the new broadcast transmitter at step S520.

Here, when the transmission frame is an ATSC 3.0 frame, the bootstrap and the preamble thereof are transmitted to the new broadcast transmitter, whereby band allocation information corresponding to the subframe may be provided.

Figure 6:
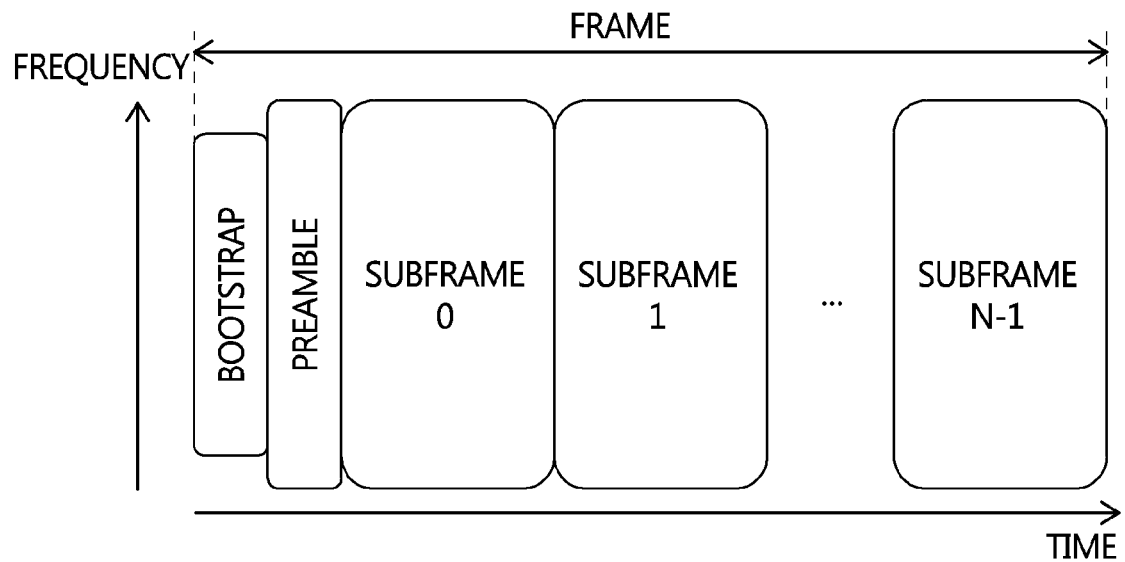
FIG. 6 is a view that shows an example of the structure of an ATSC 3.0 frame according to an embodiment of the present invention.

Here, the ATSC 3.0 frame may include three components, specifically, a bootstrap, a preamble, and multiple subframes, as shown in FIG. 6.

The bootstrap or the bootstrap signal contains basic information that is necessary in order to operate a receiver. Therefore, the bootstrap may be designed so as to be most robust to noise such that a receiver may receive the bootstrap even under poor conditions.

Also, the bootstrap may have a fixed bandwidth of 4.5 MHz regardless of the actually allocated bandwidth. The bootstrap includes four Orthogonal Frequency-Division Multiplexing (OFDM) symbols, and each symbol may have a duration of 500 μsec. Using the bootstrap, at least one of information about synchronization with a receiver, emergency alert wake-up information, system bandwidth information, and information about the version of the subframe may be delivered.

The preamble contains signaling information for physical layer (Layer 1) control and information about the frame structure of a data payload.

Accordingly, when the transmission frame of the ad-hoc broadcast service of the present invention is an ATSC 3.0 frame, the master broadcast transmitter transmits the bootstrap and the preamble of the ATSC 3.0 frame to the new broadcast transmitter, thereby providing information for allocating a frequency band.

Here, a single ATSC 3.0 frame may include multiple subframes, as shown in FIG. 6. Here, the subframes may have fixed physical layer transmission parameters, such as an FFT size, a GI length, a pilot pattern, the number of useful subcarriers, and the like.

Also, the duration of an ATSC 3.0 frame may range from 50 msec. to 5 sec.

Here, when the transmission frame is a DVB-T2 frame, the P1 symbol and the P2 symbol thereof are transmitted to the new broadcast transmitter, whereby band allocation information corresponding to the subframe may be provided.

Figure 10:
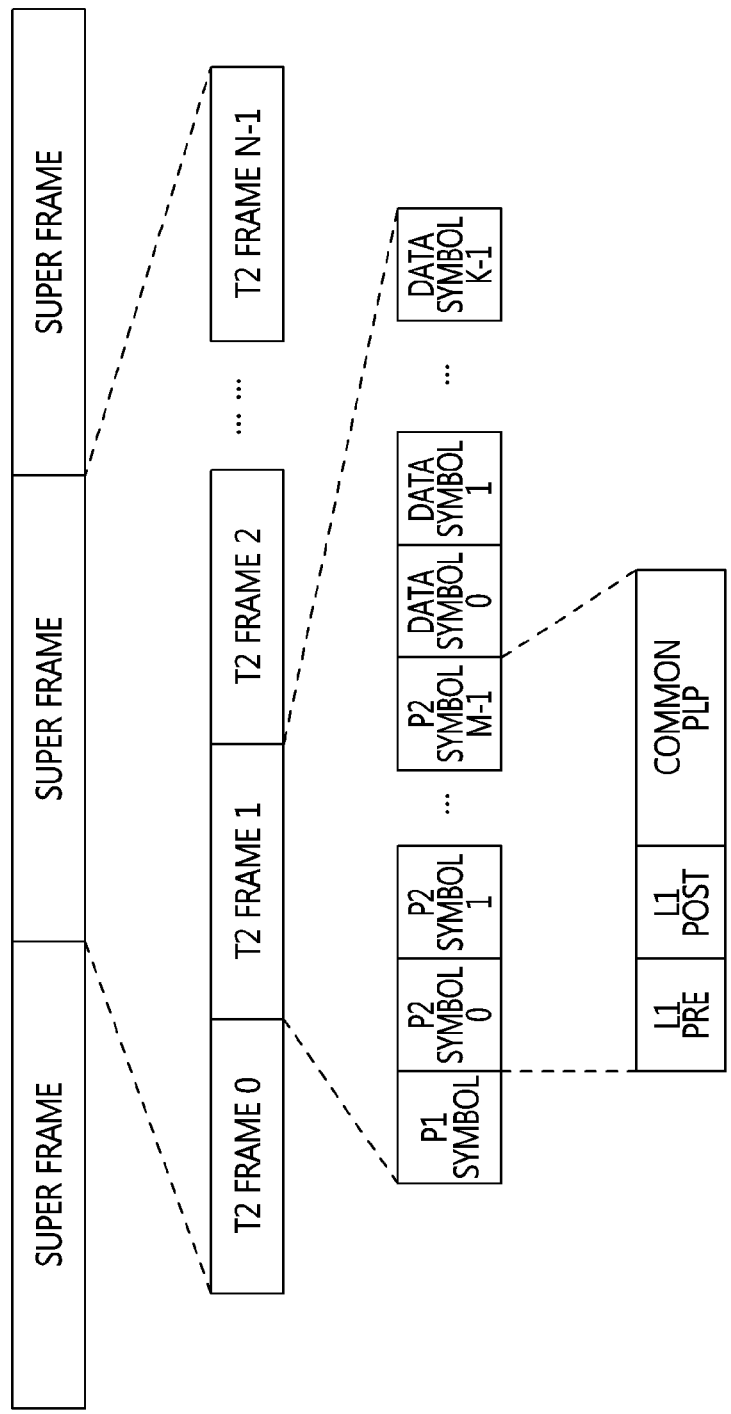
FIG. 10 is a view that shows an example of the structure of a DVB-T2 frame according to the present invention.

Here, a DVB-T2 frame may include a P1 symbol, a P2 symbol, and multiple data symbols, as shown in FIG. 10. Accordingly, when the transmission frame is a DVB-T2 frame, multiple subframes may correspond to at least one data symbol.

Also, a DVB-T2 frame is configured with OFDM symbols, and the frame length may range from 150 msec. to 250 msec.

Here, a service may be provided using a superframe that includes DVB-T2 frames as the components thereof, as shown in FIG. 10. Here, the superframe may include up to 256 DVB-T2 frames.

The P1 symbol includes information such as the start signal of a DVB-T2 frame, a Fast Fourier Transform (FFT) size, and the like.

The P2 symbol includes L1 signaling and a common PLP. Generally, the L1 signaling of the P2 symbol includes information about the structure of a DVB-T2 frame, such as the position of a PLP cell within the DVB-T2 frame, and the common PLP includes general PSI/SI for a broadcast service.

Accordingly, when the transmission frame of the ad-hoc broadcast service of the present invention is a DVB-T2 frame, the master broadcast transmitter transmits the P1 symbol and the P2 symbol of the DVB-T2 frame to the new broadcast transmitter, thereby providing information for allocating a band.

Here, the multiple subframes may be acquired by dividing the transmission frame using any one of Time-Division Multiple Access (TDMA) and Frequency-Division Multiple Access (FDMA).

For example, when the transmission frame is an ATSC 3.0 frame, each subframe of the ATSC 3.0 frame is allocated as the frequency band of a single ad-hoc broadcast network, whereby a broadcast service may be provided. That is, multiple broadcast transmitters may share a single frequency channel using TDMA or FDMA in the same broadcast channel, as shown in FIG. 7 and FIG. 8.

Figure 7:
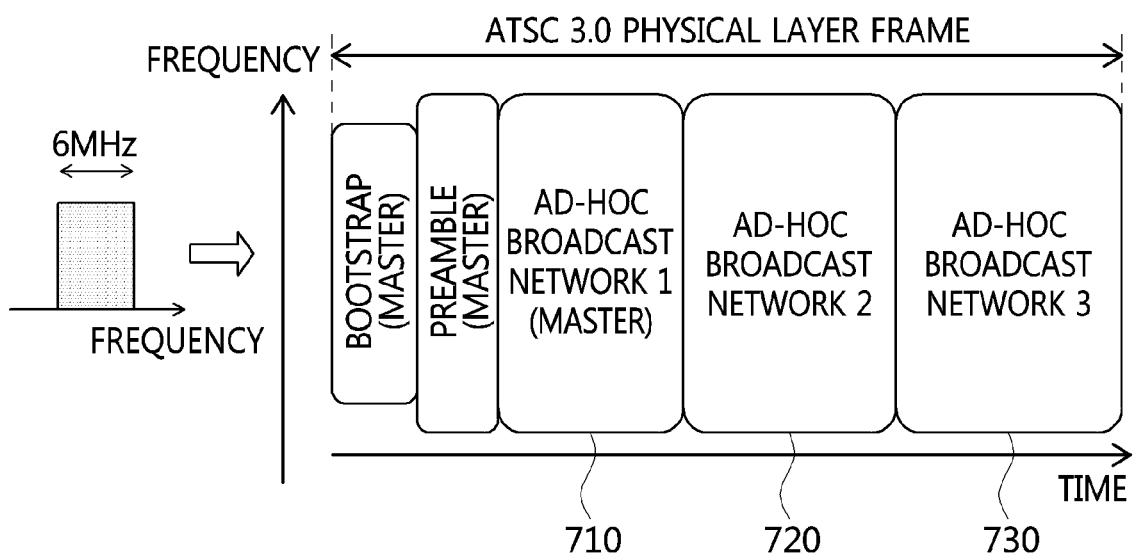
FIG. 7 is a view that shows an example of division of an ATSC 3.0 frame based on Time-Division Multiple Access (TDMA) according to the present invention.
Figure 8:
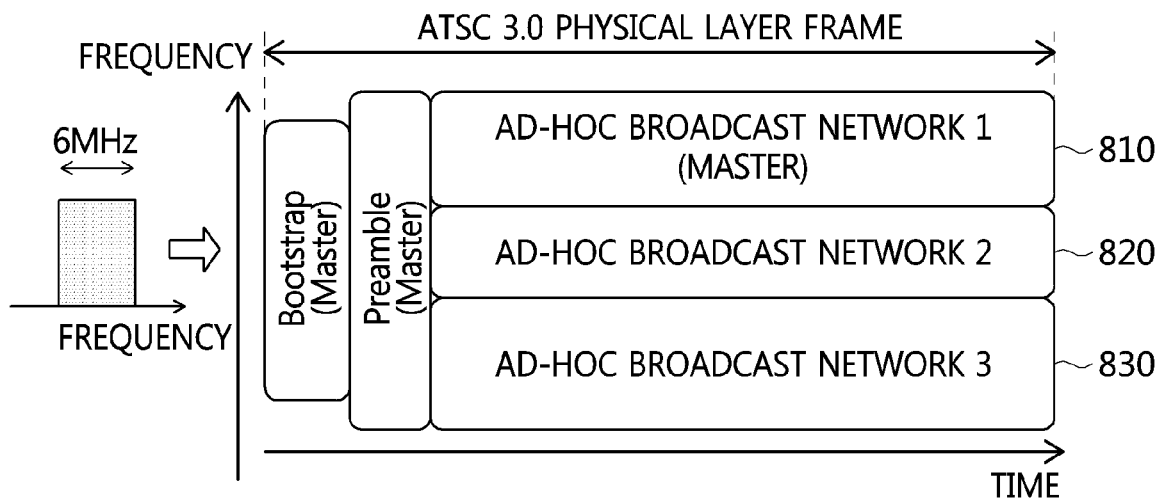
FIG. 8 is a view that shows an example of division of an ATSC 3.0 frame based on Frequency-Division Multiple Access (FDMA) according to the present invention.

First, FIG. 7 shows an example in which multiple subframes 710, 720 and 730 are generated by dividing an ATSC 3.0 frame based on TDMA.

Here, as shown in FIG. 7, the broadcast transmitter that configures an ad-hoc broadcast network using the first subframe 710 following the preamble section may be selected and used as the master broadcast transmitter.

Here, multiple ad-hoc broadcast networks may be formed using the multiple broadcast transmitters to which the multiple subframes 710, 720 and 730 are respectively allocated.

Also, FIG. 8 shows an example in which multiple subframes 810, 820 and 830 are generated by dividing an ATSC 3.0 frame based on FDMA.

Here, similar to the example shown in FIG. 7, broadcast services may be provided by forming multiple ad-hoc broadcast networks using the multiple broadcast transmitters to which the multiple subframes 810, 820 and 830 illustrated in FIG. 8 are respectively allocated.

Here, the broadcast transmitter selected as the master broadcast transmitter in FIG. 7 or FIG. 8 may transmit the bootstrap and the preamble to the remaining broadcast transmitters to which the subframes are allocated.

Figure 11:
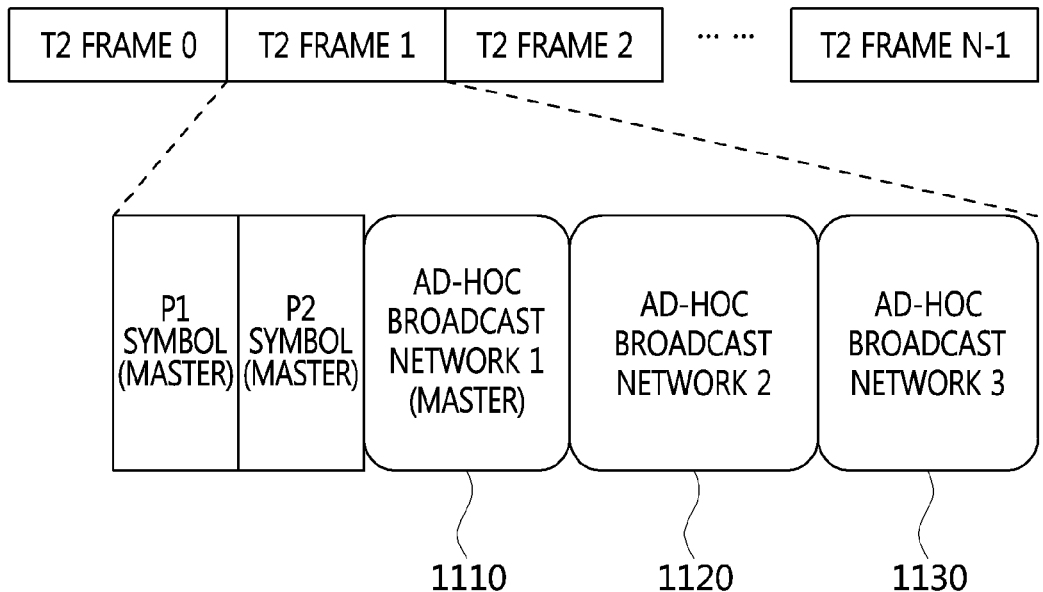
FIG. 11 is a view that shows an example of division of a DVB-T2 frame based on TDMA according to the present invention.
Figure 12:
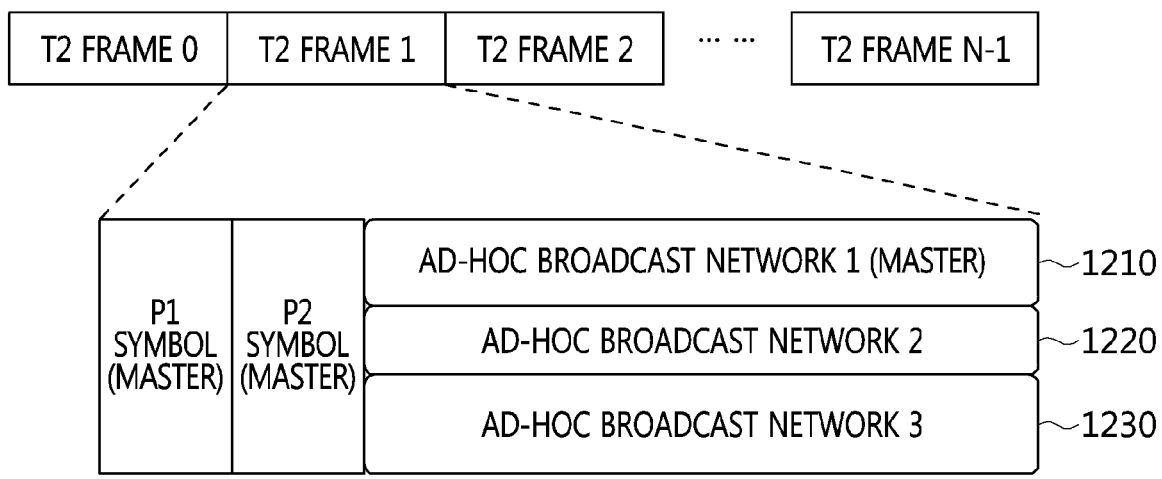
FIG. 12 is a view that shows an example of division of a DVB-T2 frame based on FDMA according to the present invention.

In another example, when the transmission frame is a DVB-T2 frame, multiple broadcast networks may be formed using TDMA or FDMA, as shown in FIG. 11 and FIG. 12, similar to the case in which the transmission frame is an ATSC 3.0 frame.

First, FIG. 11 shows an example in which multiple subframes 1110, 1120 and 1130 are generated by dividing a DVB-T2 frame based on TDMA.

Here, as shown in FIG. 11, the broadcast transmitter that configures an ad-hoc broadcast network using the first subframe 1110 following the P2 symbol section may be selected and used as the master broadcast transmitter.

Here, multiple ad-hoc broadcast networks may be formed using the multiple broadcast transmitters to which the multiple subframes 1110, 1120 and 1130 are respectively allocated.

Also, FIG. 12 shows an example in which multiple subframes 1210, 1220 and 1230 are generated by dividing a DVB-T2 frame based on FDMA.

Here, similar to the example shown in FIG. 11, broadcast services may be provided by forming multiple ad-hoc broadcast networks using the multiple broadcast transmitters to which the multiple subframes 1210, 1220 and 1230 illustrated in FIG. 12 are respectively allocated.

Here, the broadcast transmitter selected as the master broadcast transmitter in FIG. 11 or FIG. 12 may transmit the P1 symbol and the P2 symbol to the remaining broadcast transmitters to which the subframes are allocated.

Also, in the method for providing ad-hoc broadcast services based on channel sharing according to an embodiment of the present invention, the master broadcast transmitter controls the new broadcast transmitter in real time at step S530 by performing synchronization with the new broadcast transmitter based on reference time information included in a control Physical Layer Pipe (PLP).

For example, when the transmission frame is an ATSC 3.0 frame, the master broadcast transmitter may transmit a subframe after it transmits the bootstrap and the preamble to the new broadcast transmitter. Therefore, the new broadcast transmitter is required to synchronize its time with the master broadcast transmitter, and to this end, the master broadcast transmitter may configure a control PLP.

Figure 9:
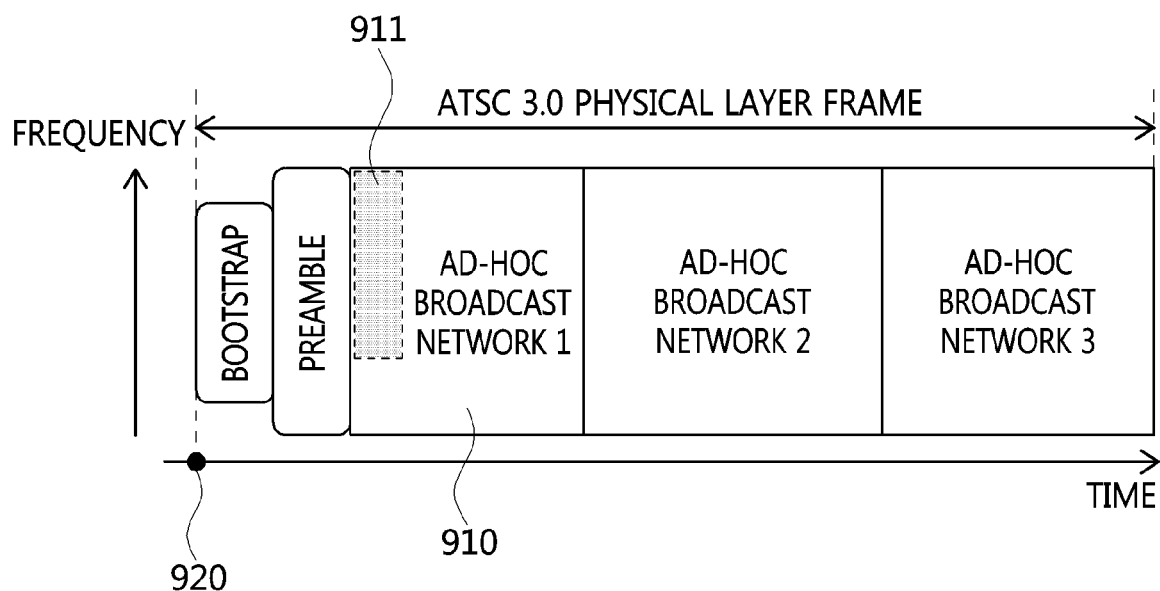
FIG. 9 is a view that shows an example of a control Physical Layer Pipe (PLP) and reference time information in an ATSC 3.0 frame according to the present invention.

Here, referring to FIG. 9, the control PLP 911 may be included in the subframe 910 allocated to the master broadcast transmitter, and may include real-time control and management information that is necessary in order for the new broadcast transmitter to configure an ad-hoc broadcast network.

Here, the most important information included in the control PLP 911 is reference time information, and the reference time information may be set using a reference clock counter value in the master broadcast transmitter.

Here, when the transmission frame is an ATSC 3.0 frame, the reference time information may be the time at which the bootstrap is transmitted or a time delayed for a preset time offset from the time at which the bootstrap is transmitted.

For example, a counter sequentially counts using a reference clock in the master broadcast transmitter, whereby the value of the counter of the reference clock at the bootstrap transmission time 920, at which the bootstrap of the current physical layer frame is output, may be set as the reference time information.

In another example, the value of the counter of the reference clock at the time delayed for the preset time offset from the bootstrap transmission time 920 may be set as the reference time information. Here, the time offset may be set to a positive (+) value or a negative (−) value. Also, when the time offset is set, the value thereof may also be transmitted to the new broadcast transmitter using the control PLP.

Here, the new broadcast transmitter may also generate internal time information using its clock. Therefore, the master broadcast transmitter may transmit the reference time information to the new broadcast transmitter using the control PLP such that the new broadcast transmitter corrects the internal time information so as to match the reference time information. Accordingly, the master broadcast transmitter and the new broadcast transmitter may synchronize a reference clock and a time therebetween.

Therefore, the new broadcast transmitter may set time information for frequency band allocation using the reference time information received from the master broadcast transmitter.

Also, when the transmission frame is a DVB-T2 frame, the master broadcast transmitter may transmit a subframe after it transmits the P1 symbol and the P2 symbol to the new broadcast transmitter. Accordingly, when the transmission frame is a DVB-T2 frame, the new broadcast transmitter is required to synchronize time with the master broadcast transmitter, similar to the case in which the transmission frame is an ATSC 3.0 frame. To this end, the master broadcast transmitter may configure a control PLP.

Figure 13:
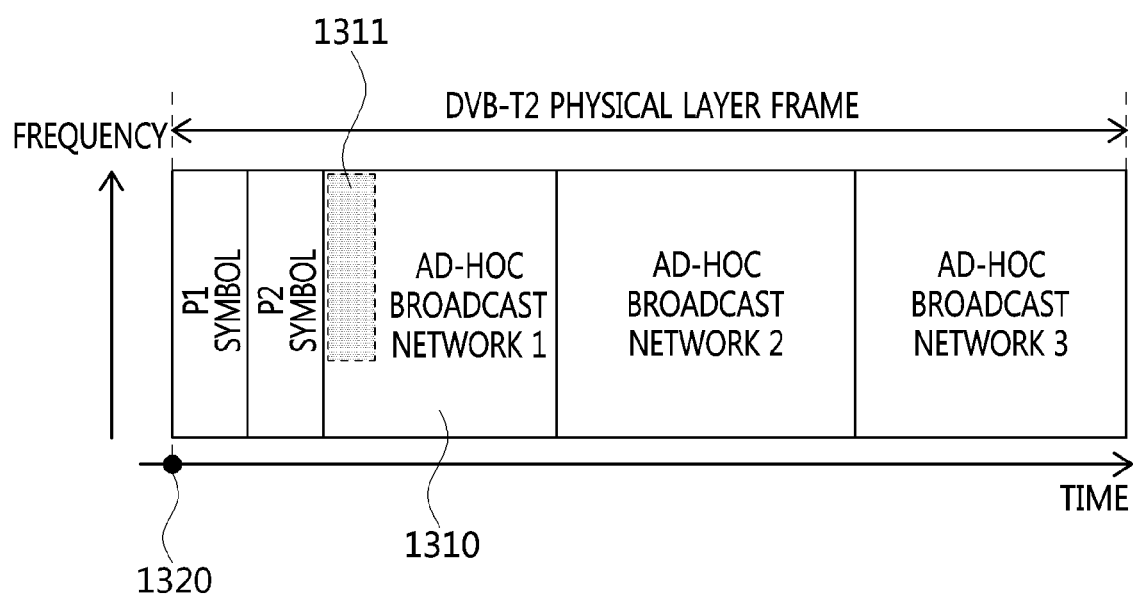
FIG. 13 is a view that shows an example of a control PLP and reference time information in a DVB-T2 frame according to the present invention.

Here, referring to FIG. 13, the control PLP 1311 may be included in the subframe 1310 allocated to the master broadcast transmitter, and may include real-time control and management information that is necessary in order for the new broadcast transmitter to configure an ad-hoc broadcast network.

Here, similar to an ATSC 3.0 frame, the most important information included in the control PLP 1311 is reference time information, and the reference time information may be set using a reference clock counter value in the master broadcast transmitter.

However, when the transmission frame is a DVB-T2 frame, the reference time information may be set based on the time at which the P1 symbol is transmitted.

For example, a counter sequentially counts using a reference clock in the master broadcast transmitter, whereby the value of the counter of the reference clock at the P1 symbol transmission time 1320, at which the P1 symbol of the current physical layer frame is output, may be set as the reference time information.

Also, although not illustrated in FIG. 5, in the method for providing ad-hoc broadcast services based on channel sharing according to an embodiment of the present invention, a control PLP is included in the subframe allocated to the master broadcast transmitter, but a common PLP may be used as the control PLP when the common PLP of the P2 symbol is capable of including the control PLP therein.

For example, when the reference time information or information for controlling an ad-hoc broadcast network in real time and information for managing the same, which are included in the control PLP 1311 illustrated in FIG. 13, can be sufficiently included in the common PLP configured with P2 symbols, the common PLP may be used as the control PLP without the need to separately configure the control PLP.

Also, although not illustrated in FIG. 5, in the method for providing ad-hoc broadcast services based on channel sharing according to an embodiment of the present invention, various kinds of information generated during the above-described process for providing an ad-hoc broadcast service may be stored in a separate storage module.

As described above, using the method for providing ad-hoc broadcast services based on channel sharing, an ad-hoc broadcast network is temporarily constructed in a small area based on the next-generation terrestrial broadcast standard in consideration of compatibility with terrestrial broadcast transmitters, and a broadcast service may be provided through the ad-hoc broadcast network.

Also, because multiple ad-hoc broadcast networks are formed using a single broadcast channel, various types of infrastructure for me-media may be facilitated, whereby the emergence of new services and broadcast markets related thereto may be stimulated.

Figure 14:
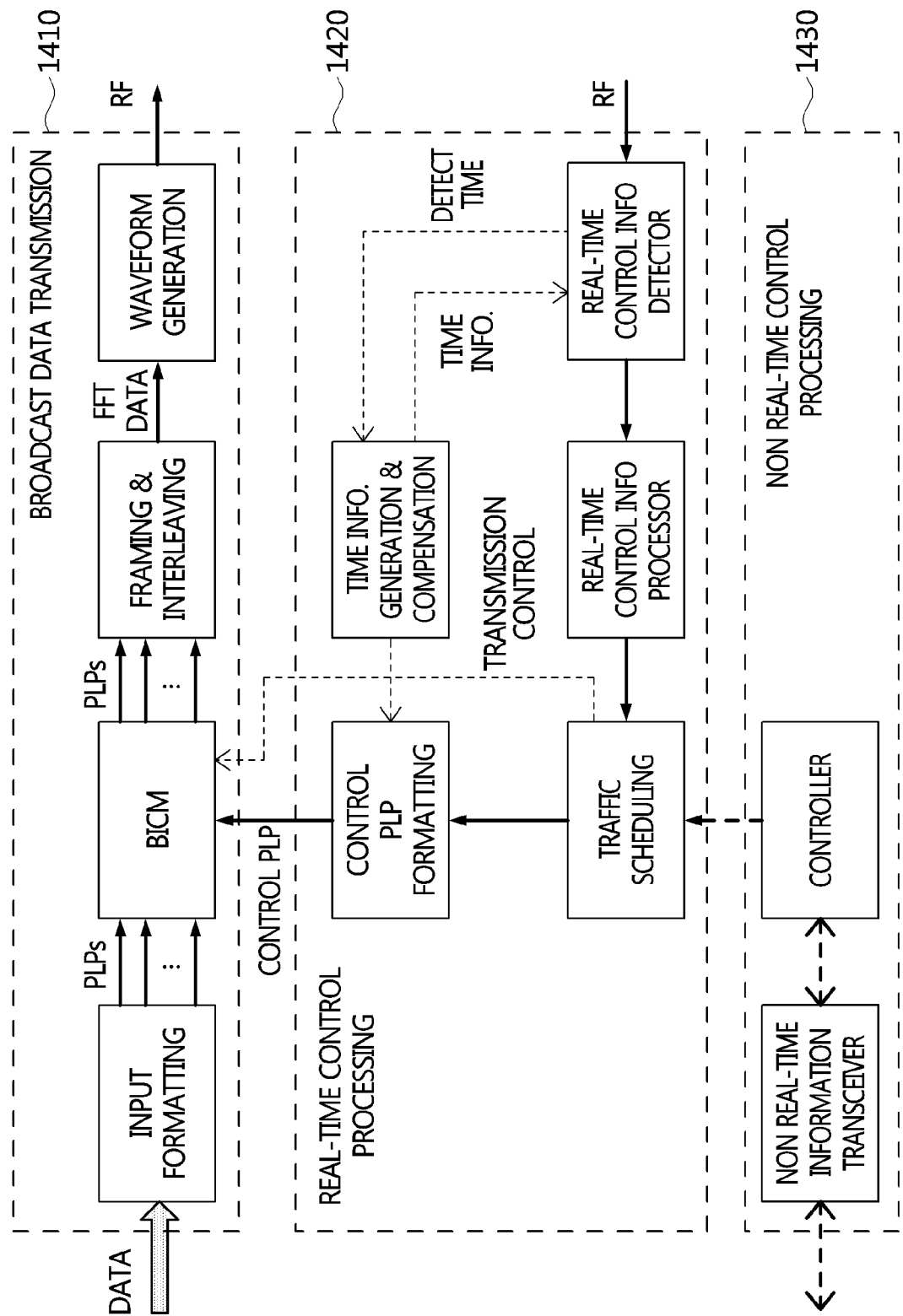
FIG. 14 is a view that specifically shows the structure of a broadcast transmitter according to an embodiment of the present invention.

FIG. 14 is a view that specifically shows the structure of a broadcast transmitter according to an embodiment of the present invention.

Referring to FIG. 14, the broadcast transmitter according to an embodiment of the present invention may basically function as a master broadcast transmitter according to the present invention. When the broadcast transmitter is not a master broadcast transmitter, the broadcast transmitter may process control and management information transmitted from the master broadcast transmitter.

The broadcast transmitter according to an embodiment of the present invention may be broadly divided into a broadcast data transmission module 1410, a real-time-control-data-processing module 1420, and a non-real-time-control-data-processing module 1430.

The broadcast data transmission module 1410 may function to transmit user data input thereto.

When the broadcast transmitter is a master broadcast transmitter, the broadcast transmitter may transmit control and management information for configuring an ad-hoc broadcast network to another broadcast transmitter through a control PLP.

Also, when it transmits broadcast data, the broadcast data transmission module 1410 may process the broadcast data under the control of the real-time-control-data-processing module 1420, for example, by receiving information about transmission time therefrom.

The real-time-control-data-processing module 1420 processes control information related to data transmission time or a transmission band.

When the broadcast transmitter is a master broadcast transmitter, the broadcast transmitter configures a control PLP with information necessary for forming an ad-hoc broadcast network, such as reference time information or band allocation information, and transmits the same to another broadcast transmitter. When the broadcast transmitter is not a master broadcast transmitter, the broadcast transmitter detects the bootstrap (or the P1 symbol in the case of a DVB-T2) transmitted from the master broadcast transmitter and delivers the time at which the bootstrap is detected to an internal time information generator, thereby correcting time information.

Also, the real-time-control-data-processing module 1420 processes real-time control information, such as the bootstrap, the preamble, the control PLP, and the like, thereby performing control so as to output the processing result corresponding to the allocated band.

The non-real-time-control-data-processing module 1430 may transmit and receive non-real-time control information via an ad-hoc communication network, such as a MANET, a P2P communication network, or a mobile communication network, such as LTE or the like, and may process the same.

Here, the non-real-time control information may include a request to allocate a band for configuring a new broadcast network, which is transmitted to the master broadcast transmitter, approval of the request, transmission timing correction information, information for managing an ad-hoc broadcast network operation, and the like.

Figure 15:
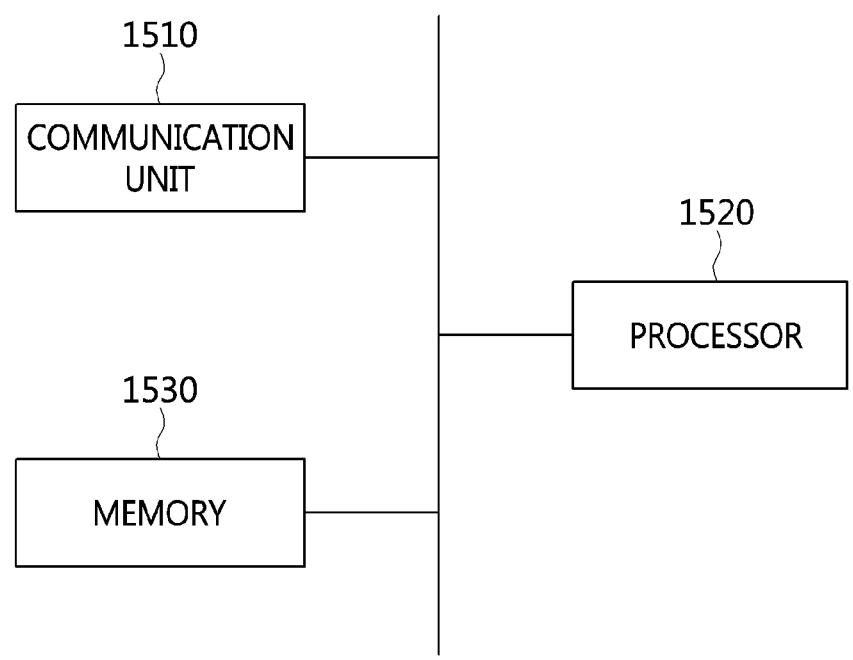
FIG. 15 is a block diagram that shows a broadcast transmitter according to an embodiment of the present invention.

FIG. 15 is a block diagram that shows a broadcast transmitter according to an embodiment of the present invention.

Referring to FIG. 15, the broadcast transmitter according to an embodiment of the present invention includes a communication unit 1510, a processor 1520, and memory 1530.

Here, the broadcast transmitter illustrated in FIG. 15 may be a master broadcast transmitter for managing and controlling other broadcast transmitters in order to provide ad-hoc broadcast services.

Here, the master broadcast transmitter is a broadcast transmitter that provides an ad-hoc broadcast service, and one of multiple broadcast transmitters that share a single broadcast channel may be selected and used as the master broadcast transmitter.

Here, the master broadcast transmitter may be selected using any of various methods. For example, the broadcast transmitter that first uses the frequency for providing an ad-hoc broadcast service and thereby configures an ad-hoc broadcast network in the corresponding area may be selected as the master broadcast transmitter.

Also, the present invention may use a special agent that functions to allocate and manage a frequency band for an ad-hoc broadcast service.

If an agent is present, the master broadcast transmitter may provide a broadcast service by transmitting and receiving information for configuring an ad-hoc broadcast network to and from the agent via a communication network. However, the agent is not essential, and the master broadcast transmitter may function to allocate and manage a frequency band for an ad-hoc broadcast service when there is no agent.

In FIG. 15, a description will be made on the assumption that there is no agent.

The communication unit 1510 functions to send and receive information that is necessary in order to provide an ad-hoc broadcast service. Particularly, the communication unit 1510 according to an embodiment of the present invention may send and receive non-real-time control and management information between broadcast transmitters.

The processor 1520 receives a request to share a channel from a new broadcast transmitter for providing an ad-hoc broadcast service.

Here, the new broadcast transmitter may be a broadcast transmitter that intends to configure a new ad-hoc broadcast network by sharing a broadcast channel with the master broadcast transmitter. That is, when the master broadcast transmitter provides an ad-hoc broadcast service through a specific broadcast channel, the new broadcast transmitter may request to share the specific broadcast channel in order to provide a new ad-hoc broadcast service.

Here, the master broadcast transmitter may function to allocate a subframe for data transmission to other broadcast transmitters and to provide control information that is necessary for multiple access, which includes physical layer parameters and the like. Accordingly, the new broadcast transmitter may receive necessary information by requesting channel sharing based on communication with the master broadcast transmitter.

If there is an agent, the new broadcast transmitter may receive necessary information from the agent via the master broadcast transmitter.

Here, communication between the master broadcast transmitter and the new broadcast transmitter may be performed using a wireless ad-hoc communication network such as a MANET, a P2P communication network, or a wireless mobile communication network such as LTE or the like. Here, when a wireless ad-hoc communication network or a P2P communication network is used, a communication network may be configured based on multiple reception terminals in consideration of the physical distance between the broadcast transmitters.

Through the above-described method, broadcast transmitters may be connected with each other through communication networks, whereby non-real-time control information and network management information may be delivered therebetween. Here, real-time control information may be transmitted by allocating a band in the subframe of the master broadcast transmitter, which will be described in detail later with a description of a control Physical Layer Pipe (PLP).

Also, the processor 1520 allocates one of multiple subframes, into which the transmission frame of any one broadcast channel corresponding to an ad-hoc broadcast service is divided, to a new broadcast transmitter.

Here, when the transmission frame is an ATSC 3.0 frame, the bootstrap and the preamble thereof are transmitted to the new broadcast transmitter, whereby band allocation information corresponding to the subframe may be provided.

Here, the ATSC 3.0 frame may include three components, specifically, a bootstrap, a preamble, and multiple subframes, as shown in FIG. 6.

The bootstrap or the bootstrap signal contains basic information that is necessary in order to operate a receiver. Therefore, the bootstrap may be designed so as to be most robust to noise such that a receiver may receive the bootstrap even under poor conditions.

Also, the bootstrap may have a fixed bandwidth of 4.5 MHz regardless of the actually allocated bandwidth. The bootstrap includes four Orthogonal Frequency-Division Multiplexing (OFDM) symbols, and each symbol may have a duration of 500 μsec. Using the bootstrap, at least one of information for synchronization with a receiver, emergency alert wake-up information, system bandwidth information, and information about the version of the subframe may be delivered.

The preamble contains signaling information for physical layer (Layer 1) control and information about the frame structure of a data payload.

Accordingly, when the transmission frame of the ad-hoc broadcast service of the present invention is an ATSC 3.0 frame, the master broadcast transmitter transmits the bootstrap and the preamble of the ATSC 3.0 frame to the new broadcast transmitter, thereby providing information for allocating a frequency band.

Here, a single ATSC 3.0 frame may include multiple subframes, as shown in FIG. 6. Here, the subframes may have fixed physical layer transmission parameters, such as an FFT size, a GI length, a pilot pattern, the number of useful subcarriers, and the like.

Also, the duration of an ATSC 3.0 frame may range from 50 msec. to 5 sec.

Here, when the transmission frame is a DVB-T2 frame, the P1 symbol and the P2 symbol thereof are transmitted to the new broadcast transmitter, whereby band allocation information corresponding to the subframe may be provided.

Here, a DVB-T2 frame may include a P1 symbol, a P2 symbol, and multiple data symbols, as shown in FIG. 10. Accordingly, when the transmission frame is a DVB-T2 frame, multiple subframes may correspond to at least one data symbol.

Also, a DVB-T2 frame is configured with OFDM symbols, and the frame length may range from 150 msec. to 250 msec.

Here, a service may be provided using a superframe that includes DVB-T2 frames as the components thereof, as shown in FIG. 10. Here, the superframe may include up to 256 DVB-T2 frames.

The P1 symbol includes information such as the start signal of a DVB-T2 frame, a Fast Fourier Transform (FFT) size, and the like.

The P2 symbol includes L1 signaling and a common PLP. Generally, the L1 signaling of the P2 symbol includes information about the structure of a DVB-T2 frame, such as the position of a PLP cell within the DVB-T2 frame, and the common PLP includes general PSI/SI for a broadcast service.

Accordingly, when the transmission frame of the ad-hoc broadcast service of the present invention is a DVB-T2 frame, the master broadcast transmitter transmits the P1 symbol and the P2 symbol of the DVB-T2 frame to the new broadcast transmitter, thereby providing information for allocating a frequency band.

Here, the multiple subframes may be acquired by dividing the transmission frame using any one of Time-Division Multiple Access (TDMA) and Frequency-Division Multiple Access (FDMA).

For example, when the transmission frame is an ATSC 3.0 frame, each subframe of the ATSC 3.0 frame is allocated as the frequency band of a single ad-hoc broadcast network, whereby a broadcast service may be provided. That is, multiple broadcast transmitters may share a single frequency channel using TDMA or FDMA in the same broadcast channel, as shown in FIG. 7 and FIG. 8.

First, FIG. 7 shows an example in which multiple subframes 710, 720 and 730 are generated by dividing an ATSC 3.0 frame based on TDMA.

Here, as shown in FIG. 7, the broadcast transmitter that configures an ad-hoc broadcast network using the first subframe 710 following the preamble section may be selected and used as the master broadcast transmitter.

Here, multiple ad-hoc broadcast networks may be formed using the multiple broadcast transmitters to which the multiple subframes 710, 720 and 730 are respectively allocated.

Also, FIG. 8 shows an example in which multiple subframes 810, 820 and 830 are generated by dividing an ATSC 3.0 frame based on FDMA.

Here, similar to the example shown in FIG. 7, broadcast services may be provided by forming multiple ad-hoc broadcast networks using the multiple broadcast transmitters to which the multiple subframes 810, 820 and 830 illustrated in FIG. 8 are respectively allocated.

Here, the broadcast transmitter selected as a master broadcast transmitter in FIG. 7 or FIG. 8 may transmit the bootstrap and the preamble to the remaining broadcast transmitters to which the subframes are allocated.

In another example, when the transmission frame is a DVB-T2 frame, multiple broadcast networks may be formed using TDMA or FDMA, as shown in FIG. 11 and FIG. 12, similar to the case in which the transmission frame is an ATSC 3.0 frame.

First, FIG. 11 shows an example in which multiple subframes 1110, 1120 and 1130 are generated by dividing a DVB-T2 frame based on TDMA.

Here, as shown in FIG. 11, the broadcast transmitter that configures an ad-hoc broadcast network using the first subframe 1110 following the P2 symbol section may be selected and used as the master broadcast transmitter.

Here, multiple ad-hoc broadcast networks may be formed using the multiple broadcast transmitters to which the multiple subframes 1110, 1120 and 1130 are respectively allocated.

Also, FIG. 12 shows an example in which multiple subframes 1210, 1220 and 1230 are generated by dividing a DVB-T2 frame based on FDMA.

Here, similar to the example shown in FIG. 11, broadcast services may be provided by forming multiple ad-hoc broadcast networks using the multiple broadcast transmitters to which the multiple subframes 1210, 1220 and 1230 illustrated in FIG. 12 are respectively allocated.

Here, the broadcast transmitter selected as a master broadcast transmitter in FIG. 11 or FIG. 12 may transmit the P1 symbol and the P2 symbol to the remaining broadcast transmitters to which the subframes are allocated.

Also, the processor 1520 controls a new broadcast transmitter in real time by performing synchronization with the new broadcast transmitter based on reference time information included in a control Physical Layer Pipe (PLP).

For example, when the transmission frame is an ATSC 3.0 frame, the master broadcast transmitter may transmit a subframe after it transmits the bootstrap and the preamble to the new broadcast transmitter. Therefore, the new broadcast transmitter is required to synchronize its time with the master broadcast transmitter, and to this end, the master broadcast transmitter may configure a control PLP.

Here, referring to FIG. 9, the control PLP 911 may be included in the subframe 910 allocated to the master broadcast transmitter, and may include real-time control and management information that is necessary in order for the new broadcast transmitter to configure an ad-hoc broadcast network.

Here, the most important information included in the control PLP 911 is reference time information, and the reference time information may be set using a reference clock counter value in the master broadcast transmitter.

Here, when the transmission frame is an ATSC 3.0 frame, the reference time information may be the time at which the bootstrap is transmitted or a time delayed for a preset time offset from the time at which the bootstrap is transmitted.

For example, a counter sequentially counts using a reference clock in the master broadcast transmitter, whereby the value of the counter of the reference clock at the bootstrap transmission time 920, at which the bootstrap of the current physical layer frame is output, may be set as the reference time information.

In another example, the value of the counter of the reference clock at the time delayed for the preset time offset from the bootstrap transmission time 920 may be set as the reference time information. Here, the time offset may be set to a positive (+) value or a negative (−) value. Also, when the time offset is set, the value thereof may also be transmitted to the new broadcast transmitter using the control PLP.

Here, the new broadcast transmitter may also generate internal time information using its clock. Therefore, the master broadcast transmitter may transmit the reference time information to the new broadcast transmitter using the control PLP such that the new broadcast transmitter corrects the internal time information so as to match the reference time information. Accordingly, the master broadcast transmitter and the new broadcast transmitter may synchronize a reference clock and a time therebetween.

Therefore, the new broadcast transmitter may set time information for frequency band allocation using the reference time information received from the master broadcast transmitter.

Also, when the transmission frame is a DVB-T2 frame, the master broadcast transmitter may transmit a subframe after it transmits the P1 symbol and the P2 symbol to the new broadcast transmitter. Accordingly, when the transmission frame is a DVB-T2 frame, the new broadcast transmitter is required to synchronize time with the master broadcast transmitter, similar to the case in which the transmission frame is an ATSC 3.0 frame. To this end, the master broadcast transmitter may configure a control PLP.

Here, referring to FIG. 13, the control PLP 1311 may be included in the subframe 1310 allocated to the master broadcast transmitter, and may include real-time control and management information that is necessary in order for the new broadcast transmitter to configure an ad-hoc broadcast network.

Here, similar to an ATSC 3.0 frame, the most important information included in the control PLP 1311 is reference time information, and the reference time information may be set using a reference clock counter value in the master broadcast transmitter.

However, when the transmission frame is a DVB-T2 frame, the reference time information may be set based on the time at which the P1 symbol is transmitted.

For example, a counter sequentially counts using a reference clock in the master broadcast transmitter, whereby the value of the counter of the reference clock at the P1 symbol transmission time 1320, at which the P1 symbol of the current physical layer frame is output, may be set as the reference time information.

Also, the processor 1520 includes a control PLP in the subframe allocated to the broadcast transmitter, but may alternatively use a common PLP as the control PLP when the common PLP of the P2 symbol is capable of including the control PLP therein.

For example, when the reference time information or information for controlling an ad-hoc broadcast network in real time and information for managing the same, which are included in the control PLP 1311 illustrated in FIG. 13, can be sufficiently included in the common PLP configured with P2 symbols, the common PLP may be used as the control PLP without the need to separately configure the control PLP.

The memory 1530 stores at least one of reference time information and control information for sharing any one broadcast channel. Also, the memory 1530 may store various kinds of information generated during the above-described process for providing ad-hoc broadcast services.

Through the above-described broadcast transmitter, an ad-hoc broadcast network is temporarily constructed in a small area based on the next-generation terrestrial broadcast standard in consideration of compatibility with terrestrial broadcast transmitters, and a broadcast service may be provided through the ad-hoc broadcast network.

Also, because multiple ad-hoc broadcast networks are formed using a single broadcast channel, various types of infrastructure for me-media may be facilitated, whereby the emergence of new services and broadcast markets related thereto may be stimulated.

According to the present invention, an ad-hoc broadcast network may be temporarily constructed in a small area based on a next-generation terrestrial broadcast standard in consideration of compatibility with terrestrial broadcast transmitters, whereby a broadcast service may be provided.

Also, the present invention enables multiple ad-hoc broadcast networks to be configured through a single broadcast channel, thereby facilitating various types of infrastructure for me-media and stimulating the emergence of new services and broadcast markets related thereto.

As described above, the method and apparatus for providing ad-hoc broadcast services based on channel sharing according to the present invention are not limitedly applied to the configurations and operations of the above-described embodiments, but all or some of the embodiments may be selectively combined and configured, so that the embodiments may be modified in various ways.

What is claimed is:

1. A method for providing ad-hoc broadcast services based on channel sharing, comprising:
    receiving, by a master broadcast transmitter for providing an ad-hoc broadcast service, a request to share a channel from a new broadcast transmitter;
    allocating, by the master broadcast transmitter, one of multiple subframes, into which a transmission frame of any one broadcast channel corresponding to the ad-hoc broadcast service is divided, to the new broadcast transmitter; and
    performing, by the master broadcast transmitter, synchronization with the new broadcast transmitter based on reference time information included in a control Physical Layer Pipe (PLP), thereby controlling the new broadcast transmitter in real time.

2. The method of claim 1, wherein allocating one of the multiple subframes comprises:
    when the transmission frame is an ATSC 3.0 frame, transmitting a bootstrap and a preamble to the new broadcast transmitter, thereby providing band allocation information corresponding to the subframe; and
    when the transmission frame is a DVB-T2 frame, transmitting a P1 symbol and a P2 symbol to the new broadcast transmitter, thereby providing band allocation information corresponding to the subframe.

3. The method of claim 2, further comprising:
    including the control PLP in a subframe for the master broadcast transmitter, but using a common PLP of the P2 symbol as the control PLP when the common PLP is capable of including the control PLP.

4. The method of claim 1, wherein the reference time information is set using a reference clock counter value in the master broadcast transmitter.

5. The method of claim 2, wherein:
    the reference time information corresponds to a time at which the bootstrap is transmitted or a time delayed for a preset time offset from the time at which the bootstrap is transmitted when the transmission frame is the ATSC 3.0 frame, and the reference time information corresponds to a time at which the P1 symbol is transmitted when the transmission frame is the DVB-T2 frame.

6. The method of claim 4, wherein controlling the new broadcast transmitter is configured to transmit the reference time information to the new broadcast transmitter using the control PLP such that the new broadcast transmitter corrects internal time information so as to match the reference time information.

7. The method of claim 1, wherein the multiple subframes are acquired by dividing the transmission frame using any one of Time-Division Multiple Access (TDMA) and Frequency-Division Multiple Access (FDMA).

8. The method of claim 2, wherein, when the transmission frame is the DVB-T2 frame, the multiple subframes correspond to at least one data symbol.

9. A broadcast transmitter, comprising:
a processor for receiving a request to share a channel from a new broadcast transmitter for providing an ad-hoc broadcast service, allocating one of multiple subframes, into which a transmission frame of any one broadcast channel corresponding to the ad-hoc broadcast service is divided, to the new broadcast transmitter, and controlling the new broadcast transmitter in real time by performing synchronization with the new broadcast transmitter based on reference time information included in a control Physical Layer Pipe (PLP); and
memory for storing the reference time information and control information for sharing the any one broadcast channel.

10. The broadcast transmitter of claim 9, wherein the processor is configured to:
provide band allocation information corresponding to the subframe by transmitting a bootstrap and a preamble to the new broadcast transmitter when the transmission frame is an ATSC 3.0 frame; and
provide band allocation information corresponding to the subframe by transmitting a P1 symbol and a P2 symbol to the new broadcast transmitter when the transmission frame is a DVB-T2 frame.

11. The broadcast transmitter of claim 10, wherein the processor includes the control PLP in the subframe corresponding to the broadcast transmitter, but uses a common PLP of the P2 symbol as the control PLP when the common PLP is capable of including the control PLP.

12. The broadcast transmitter of claim 9, wherein the reference time information is set using a reference clock counter value in the broadcast transmitter.

13. The broadcast transmitter of claim 10, wherein:
the reference time information corresponds to a time at which the bootstrap is transmitted or a time delayed for a preset time offset from the time at which the bootstrap is transmitted when the transmission frame is the ATSC 3.0 frame, and
the reference time information corresponds to a time at which the P1 symbol is transmitted when the transmission frame is the DVB-T2 frame.

14. The broadcast transmitter of claim 12, wherein the processor transmits the reference time information to the new broadcast transmitter using the control PLP such that the new broadcast transmitter corrects internal time information so as to match the reference time information.

15. The broadcast transmitter of claim 9, wherein the multiple subframes are acquired by dividing the transmission frame using any one of Time-Division Multiple Access (TDMA) and Frequency-Division Multiple Access (FDMA).

16. The broadcast transmitter of claim 10, wherein, when the transmission frame is the DVB-T2 frame, the multiple subframes correspond to at least one data symbol.

* * * * *